(12) United States Patent
Sugiyama et al.

(10) Patent No.: US 12,447,917 B2
(45) Date of Patent: Oct. 21, 2025

(54) VEHICLE SYSTEM

(71) Applicant: Yazaki Corporation, Tokyo (JP)

(72) Inventors: Nobuhiro Sugiyama, Shizuoka (JP); You Yanagida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 152 days.

(21) Appl. No.: 18/585,640

(22) Filed: Feb. 23, 2024

(65) Prior Publication Data

US 2024/0190372 A1 Jun. 13, 2024

Related U.S. Application Data

(63) Continuation of application No. PCT/JP2022/035625, filed on Sep. 26, 2022.

(30) Foreign Application Priority Data

Sep. 27, 2021 (JP) ................................. 2021-156244

(51) Int. Cl.
*B60R 21/01* (2006.01)
*B60R 16/023* (2006.01)
*H04L 67/12* (2022.01)

(52) U.S. Cl.
CPC .......... *B60R 21/01* (2013.01); *B60R 16/0231* (2013.01); *H04L 67/12* (2013.01);
(Continued)

(58) Field of Classification Search
CPC ................ B60R 21/01; B60R 16/0231; B60R 2021/01115; B60R 2021/01286;
(Continued)

(56) References Cited

U.S. PATENT DOCUMENTS

| | | | |
|---|---|---|---|
| 7,561,951 B2* | 7/2009 | Rao ..................... | B60W 50/035 340/438 |
| 10,759,369 B2* | 9/2020 | Jang ..................... | B62D 15/021 |

(Continued)

FOREIGN PATENT DOCUMENTS

| | | | | |
|---|---|---|---|---|
| CN | 109541457 A | * | 3/2019 | ......... G01R 31/3275 |
| CN | 111276368 A | * | 6/2020 | ............. H01H 47/32 |
| JP | 2015-099517 A | | 5/2015 | |

*Primary Examiner* — Mary Cheung
(74) *Attorney, Agent, or Firm* — Sughrue Mion, PLLC

(57) ABSTRACT

A safety standard of a predetermined level is set for a function to be implemented in each of devices. A central ECU includes ASIL ECUs to, in which each of the ASIL ECUS to is allocated for each level of the safety standard and is able to execute, on the device, confirmation processing according to the allocated level. A network branch unit distributes and transmits each of input signals from the devices, the input signals being respectively transmitted from zone ECUs, to a corresponding one of the ASIL ECUS each having the level allocated thereto and corresponding to the function of the device, and distributes and transmits each of output signals from the ASIL ECUs, the output signals being respectively transmitted from the ASIL ECUs, to a corresponding one of the zone ECUs each having transmitted the input signal from the device subjected to the confirmation processing.

7 Claims, 13 Drawing Sheets

(52) U.S. Cl.
CPC ........... *B60R 2021/01115* (2013.01); *B60R 2021/01286* (2013.01)

(58) Field of Classification Search
CPC ....... B60R 16/02; B60R 16/023; H04L 67/12; H04L 12/28
See application file for complete search history.

(56) References Cited

U.S. PATENT DOCUMENTS

| | | | |
|---|---|---|---|
| 11,027,744 B2* | 6/2021 | Hammerschmidt | ........................ B60W 50/0205 |
| 2005/0236211 A1* | 10/2005 | Hirota | ................ B60N 2/42736 180/274 |
| 2008/0074247 A1* | 3/2008 | Plantamura | ....... B60W 50/0205 340/691.3 |
| 2022/0185325 A1* | 6/2022 | Chen | ...................... B62D 15/02 |
| 2022/0185339 A1* | 6/2022 | Chen | ...................... B60W 10/06 |

* cited by examiner

FIG.4

| | VEHICLE SYSTEM | | | | | |
|---|---|---|---|---|---|---|
| | ADAS/AUTOMATIC DRIVING SYSTEM | CHASSIS SYSTEM | HMI/MM SYSTEM | BODY SYSTEM | POWER TRAIN SYSTEM | AIRBAG SYSTEM |
| FUNCTIONS NOT BELONGING TO ASIL | | | | | | |
| ASIL-A | · REAR-VIEW CAMERA<br>· BACKWARD DRIVING ASSISTANCE | | · AUDIO | · AIR CONDITIONER<br>· SEAT HEATER | | |
| ASIL-B | | · ACTIVE SUSPENSION<br>· SKID PREVENTION | · NAVIGATION | · BACKLIGHT | | |
| ASIL-C | · HIGH-PRECISION MAP<br>· VEHICLE-TO-VEHICLE COMMUNICATION, ROAD-TO-VEHICLE COMMUNICATION | | · INSTRUMENT CLUSTER | · HEADLIGHT<br>· BRAKE LAMP<br>· SMART KEY<br>· DOOR LOCK<br>· POWER WINDOW | | |
| ASIL-D | · ADAPTIVE CRUISE CONTROL | · ANTI-LOCK BRAKE<br>· ELECTRIC POWER STEERING | | · WIPER<br>· ELECTRONIC MIRROR | · ENGINE MANAGEMENT<br>· HV CONTROL<br>· BATTERY CONTROL<br>· SHIFT CONTROL | · AIRBAG CONTROL<br>· e-call |

| FRAME START | TRANSMISSION SOURCE ID: ZONE ECU 21 | TRANSMISSION DESTINATION ID: NETWORK BRANCH UNIT | DATA AREA | ASIL-A | ASIL-B | ASIL-C | ASIL-D | ERROR DETECTION AND CORRECTION AREA | FRAME END | ~F11 (F1) |
| FRAME START | TRANSMISSION SOURCE ID: ZONE ECU 22 | TRANSMISSION DESTINATION ID: NETWORK BRANCH UNIT | DATA AREA | ASIL-A | ASIL-B | ASIL-C | ASIL-D | ERROR DETECTION AND CORRECTION AREA | FRAME END | ~F12 (F1) |
| FRAME START | TRANSMISSION SOURCE ID: ZONE ECU 23 | TRANSMISSION DESTINATION ID: NETWORK BRANCH UNIT | DATA AREA | ASIL-A | ASIL-B | ASIL-C | ASIL-D | ERROR DETECTION AND CORRECTION AREA | FRAME END | ~F13 (F1) |
| FRAME START | TRANSMISSION SOURCE ID: ZONE ECU 24 | TRANSMISSION DESTINATION ID: NETWORK BRANCH UNIT | DATA AREA | ASIL-A | ASIL-B | ASIL-C | ASIL-D | ERROR DETECTION AND CORRECTION AREA | FRAME END | ~F14 (F1) |

FIG.10

| FRAME START | TRANSMISSION SOURCE ID: NETWORK BRANCH UNIT | TRANSMISSION DESTINATION ID: ASIL-A ECU 31 | DATA AREA | ZONE ECU 21 | ZONE ECU 22 | ZONE ECU 23 | ZONE ECU 24 | ERROR DETECTION AND CORREC- TION AREA | FRAME END | ~F21 (F2) |
| FRAME START | TRANSMISSION SOURCE ID: NETWORK BRANCH UNIT | TRANSMISSION DESTINATION ID: ASIL-B ECU 32 | DATA AREA | ZONE ECU 21 | ZONE ECU 22 | ZONE ECU 23 | ZONE ECU 24 | ERROR DETECTION AND CORREC- TION AREA | FRAME END | ~F22 (F2) |
| FRAME START | TRANSMISSION SOURCE ID: NETWORK BRANCH UNIT | TRANSMISSION DESTINATION ID: ASIL-C ECU 33 | DATA AREA | ZONE ECU 21 | ZONE ECU 22 | ZONE ECU 23 | ZONE ECU 24 | ERROR DETECTION AND CORREC- TION AREA | FRAME END | ~F23 (F2) |
| FRAME START | TRANSMISSION SOURCE ID: NETWORK BRANCH UNIT | TRANSMISSION DESTINATION ID: ASIL-D ECU 34 | DATA AREA | ZONE ECU 21 | ZONE ECU 22 | ZONE ECU 23 | ZONE ECU 24 | ERROR DETECTION AND CORREC- TION AREA | FRAME END | ~F24 (F2) |

| FRAME START | TRANSMISSION SOURCE ID: ASIL-A ECU 31 | TRANSMISSION DESTINATION ID: NETWORK BRANCH UNIT | DATA AREA | ZONE ECU 21 | ZONE ECU 22 | ZONE ECU 23 | ZONE ECU 24 | ERROR DETECTION AND CORRECTION AREA | FRAME END | ~F31 (F3) |
| FRAME START | TRANSMISSION SOURCE ID: ASIL-B ECU 32 | TRANSMISSION DESTINATION ID: NETWORK BRANCH UNIT | DATA AREA | ZONE ECU 21 | ZONE ECU 22 | ZONE ECU 23 | ZONE ECU 24 | ERROR DETECTION AND CORRECTION AREA | FRAME END | ~F32 (F3) |
| FRAME START | TRANSMISSION SOURCE ID: ASIL-C ECU 33 | TRANSMISSION DESTINATION ID: NETWORK BRANCH UNIT | DATA AREA | ZONE ECU 21 | ZONE ECU 22 | ZONE ECU 23 | ZONE ECU 24 | ERROR DETECTION AND CORRECTION AREA | FRAME END | ~F33 (F3) |
| FRAME START | TRANSMISSION SOURCE ID: ASIL-D ECU 34 | TRANSMISSION DESTINATION ID: NETWORK BRANCH UNIT | DATA AREA | ZONE ECU 21 | ZONE ECU 22 | ZONE ECU 23 | ZONE ECU 24 | ERROR DETECTION AND CORRECTION AREA | FRAME END | ~F34 (F3) |

| FRAME START | TRANSMISSION SOURCE ID: NETWORK BRANCH UNIT | TRANSMISSION DESTINATION ID: ZONE ECU 21 | DATA AREA | ASIL-A | ASIL-B | ASIL-C | ASIL-D | ERROR DETECTION AND CORRECTION AREA | FRAME END | ~F41 (F4) |
| FRAME START | TRANSMISSION SOURCE ID: NETWORK BRANCH UNIT | TRANSMISSION DESTINATION ID: ZONE ECU 22 | DATA AREA | ASIL-A | ASIL-B | ASIL-C | ASIL-D | ERROR DETECTION AND CORRECTION AREA | FRAME END | ~F42 (F4) |
| FRAME START | TRANSMISSION SOURCE ID: NETWORK BRANCH UNIT | TRANSMISSION DESTINATION ID: ZONE ECU 23 | DATA AREA | ASIL-A | ASIL-B | ASIL-C | ASIL-D | ERROR DETECTION AND CORRECTION AREA | FRAME END | ~F43 (F4) |
| FRAME START | TRANSMISSION SOURCE ID: NETWORK BRANCH UNIT | TRANSMISSION DESTINATION ID: ZONE ECU 24 | DATA AREA | ASIL-A | ASIL-B | ASIL-C | ASIL-D | ERROR DETECTION AND CORRECTION AREA | FRAME END | ~F44 (F4) |

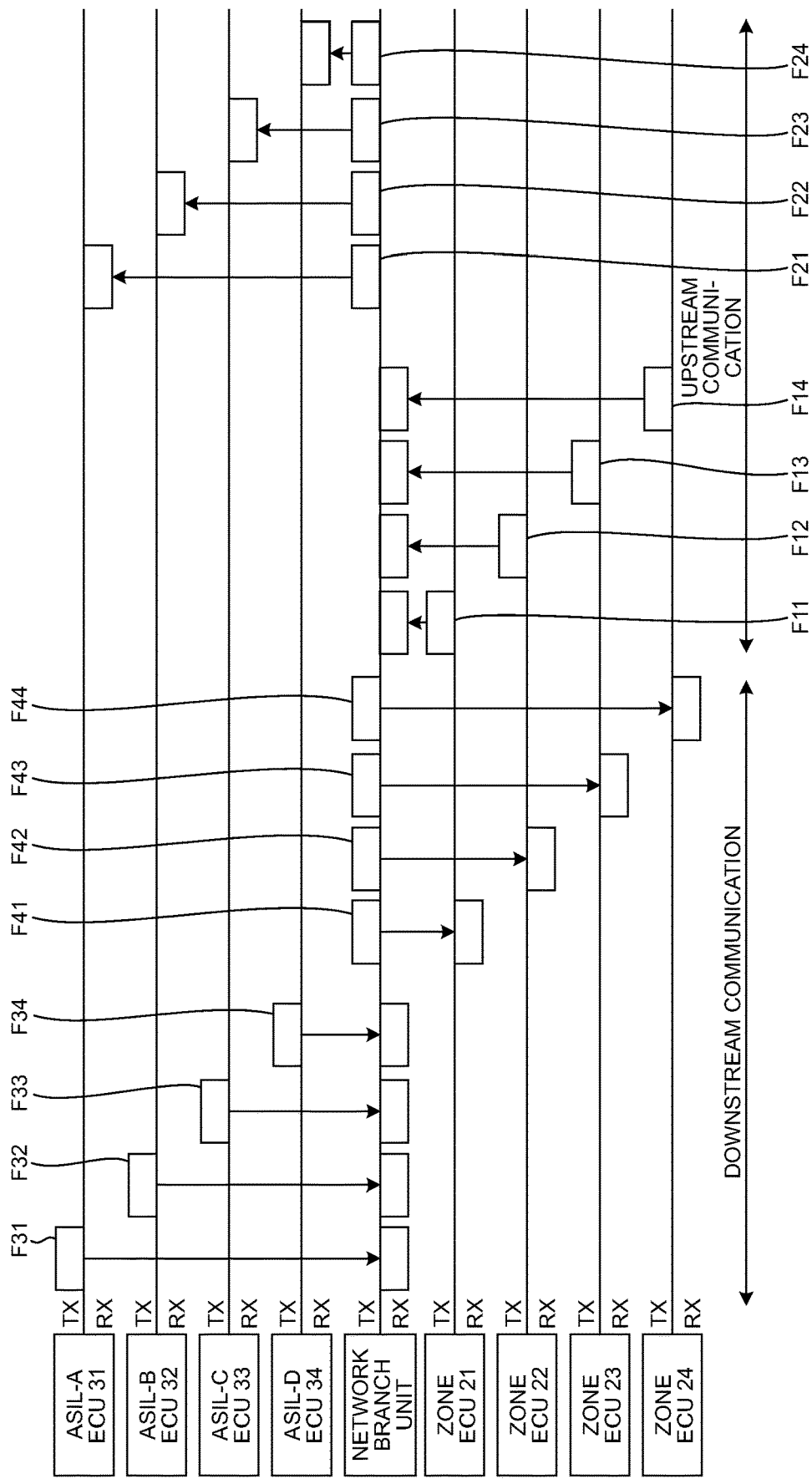

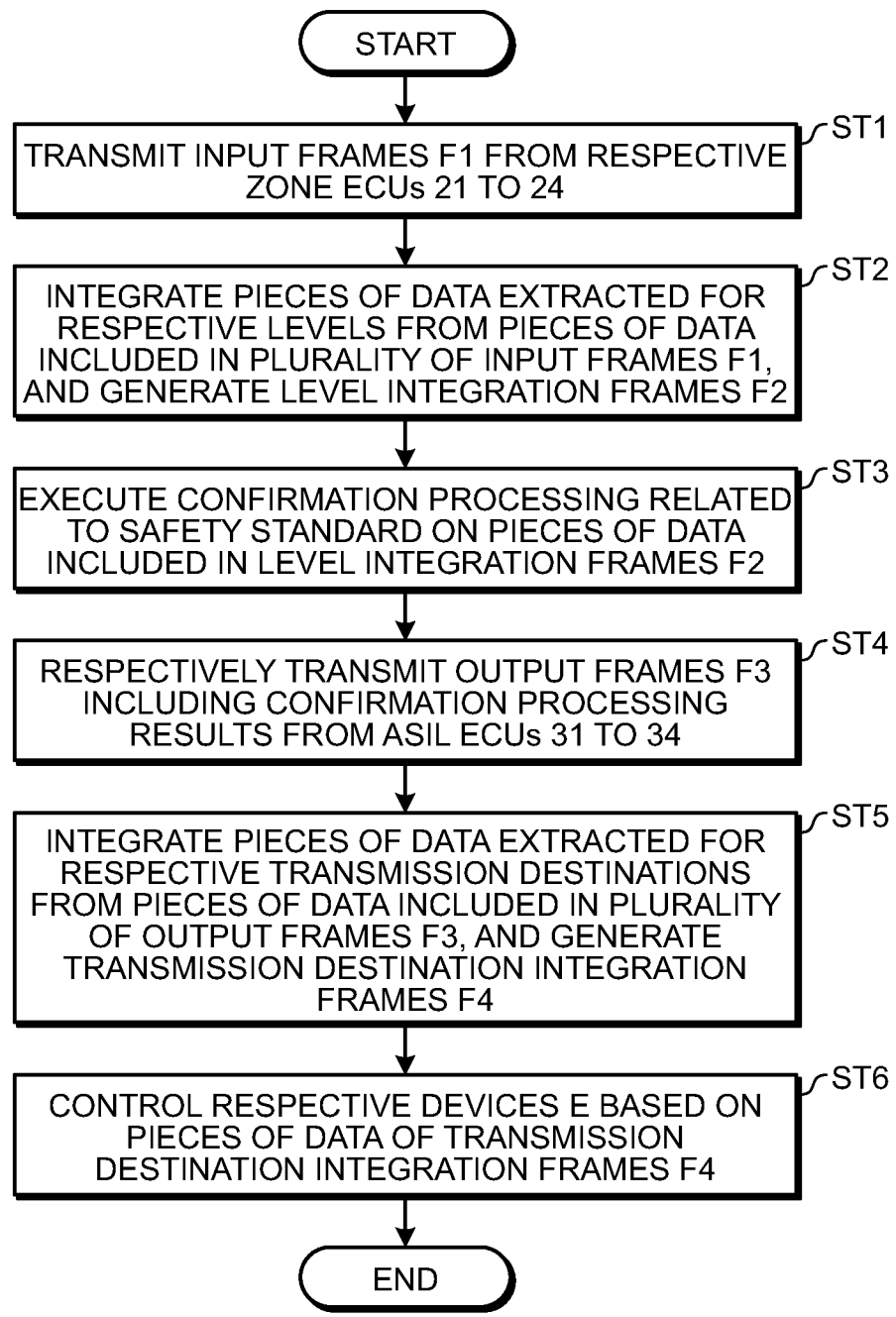

VEHICLE SYSTEM

CROSS-REFERENCE TO RELATED APPLICATION (S)

This application is a continuation application of International Application No. PCT/JP2022/035625 filed on Sep. 26, 2022 which claims the benefit of priority from Japanese Patent Application No. 2021-156244 filed on Sep. 27, 2021 and designating the U.S., the entire contents of which are incorporated herein by reference.

BACKGROUND OF THE INVENTION

1. Field of the Invention

The present invention relates to a vehicle system.

2. Description of the Related Art

Conventionally, as a vehicle system, for example, Japanese Patent Application Laid-open No. 2015-99517 describes a vehicle control device that controls a vehicle using a plurality of pieces of software in which different degrees of safety are set. This vehicle control device includes, for example, a plurality of pieces of software respectively having different degrees of safety set therein, a storage area corresponding to the degree of safety, the storage area being divided into a plurality of areas corresponding to the degrees of safety of the plurality of pieces of software and configured to store data calculated by the software, a shared storage area configured to store, for access of the software having a low degree of safety, the data calculated by the software having a high degree of safety, and a switching unit configured to switch, according to the degree of safety of the software, the storage area of an access destination at the time of referring to the same data, in which the plurality of pieces of software include a function that calls the switching unit to refer to the same data. According to this configuration, the vehicle control device can call, when the storage area accessed by the software is changed, the switching unit by the function of the software and refer to the same data without using hardware such as a memory management unit, thereby making it possible to improve reusability of the software.

Meanwhile, in the vehicle control device described in Japanese Patent Application Laid-open No. 2015-99517, for example, since a plurality of pieces of software having different degrees of safety are mixed in the same vehicle control device, it is necessary to match the performance of a device with software having a high degree of safety, and as a result, there is a possibility that excessive performance is caused when software having a low degree of safety is executed.

SUMMARY OF THE INVENTION

Therefore, the present invention has been made in view of the above-described problems, and it is an object of the present invention to provide a vehicle system capable of appropriately constructing a system for securing safety.

In order to achieve the above mentioned object, a vehicle system according to one aspect of the present invention includes a plurality of devices mounted on a vehicle, each of the devices implementing a function having a safety standard of a predetermined level set therein; a plurality of device controllers configured to respectively control the devices divided for each control system; a central controller configured to be able to execute, on the plurality of devices, confirmation processing related to the safety standard; and a relay unit configured to relay, between the plurality of device controllers and the central controller, an input signal related to the confirmation processing from the device and an output signal related to the confirmation processing from the central controller, wherein the central controller is configured to include a plurality of single-level controllers, wherein each of the single-level controllers is allocated to a corresponding one of the levels of the safety standards and is capable of executing, on the device, the confirmation processing corresponding to the allocated level, and wherein the relay unit is configured to distribute and transmit each of the input signals from the devices, the input signals being respectively transmitted from the plurality of device controllers, to a corresponding one of the single-level controllers, each of the single-level controllers having the level allocated thereto and configured to correspond to the function of the device, and to distribute and transmit each of the output signals from the single-level controllers, the output signals being respectively transmitted from the plurality of single-level controllers, to a corresponding one of the device controllers, each of the device controllers having transmitted the input signal from the device subjected to the confirmation processing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a relationship between a function of a vehicle and a vehicle safety standard according to the embodiment;

FIG. 9 is a diagram illustrating a configuration example of a frame of an input signal according to the embodiment;

FIG. 10 is a diagram illustrating a configuration example of a level integration frame according to the embodiment;

FIG. 11 is a diagram illustrating a configuration example of a frame of an output signal according to the embodiment;

FIG. 12 is a diagram illustrating a configuration example of a transmission destination integration frame according to the embodiment;

FIG. 13 is a diagram illustrating a communication example of a frame according to the embodiment;

FIG. 14 is a flowchart illustrating an operation example of the vehicle system according to the embodiment;

DETAILED DESCRIPTION OF THE PREFERRED EMBODIMENTS

A mode (embodiment) for carrying out the present invention will be described in detail with reference to the drawings. The present invention is not limited by contents described in the following embodiments. In addition, the component elements described below include those that can be easily assumed by those skilled in the art and those that are substantially the same. Furthermore, configurations described below can be appropriately combined. In addition, various omissions, substitutions, or changes in the configuration can be made without departing from the gist of the present invention.

Embodiment

Figure 1:
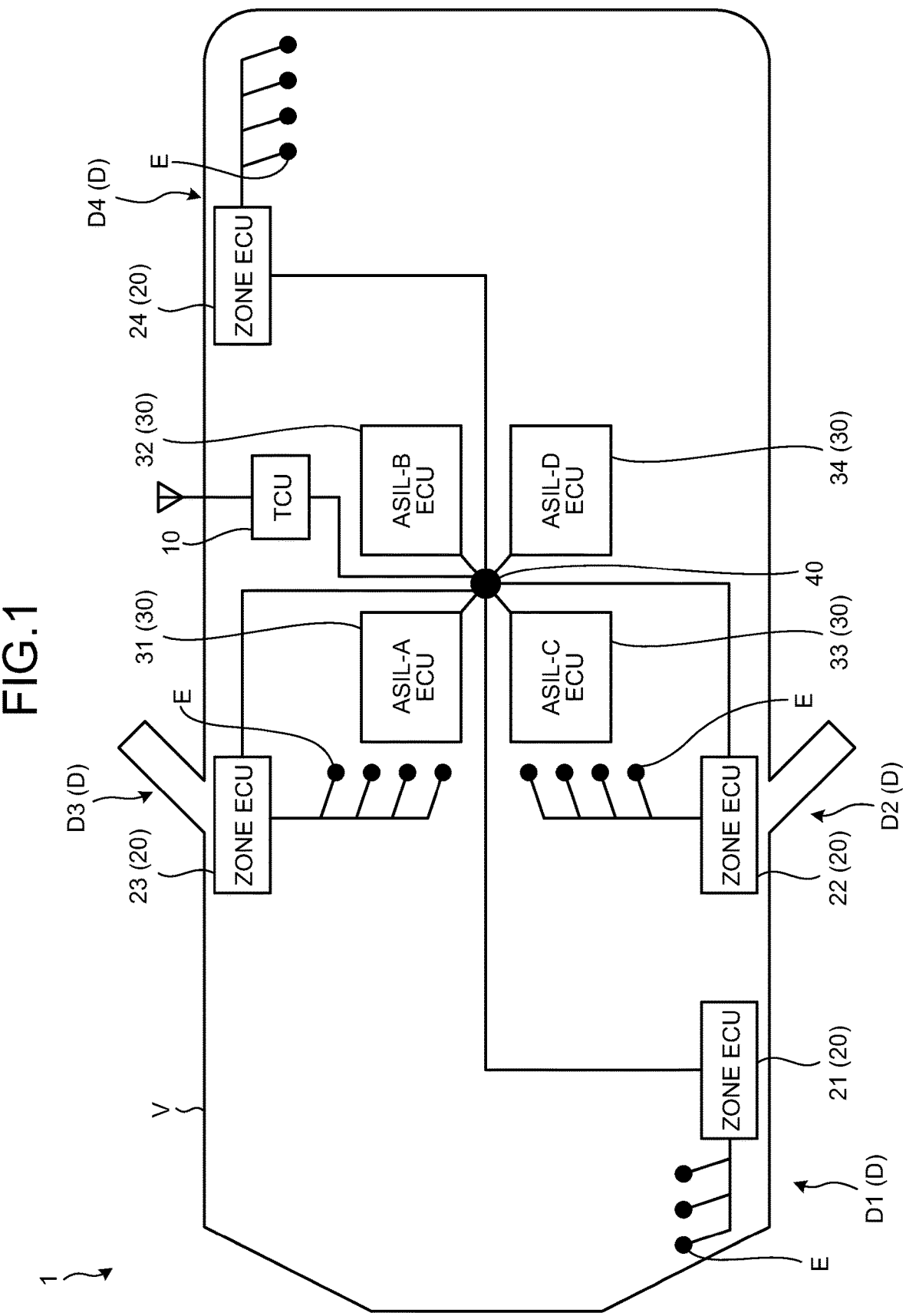
FIG. 1 is a schematic diagram illustrating a configuration example of a vehicle system according to an embodiment.

A vehicle system 1 according to an embodiment will be described with reference to the drawings. The vehicle system 1 is provided in a vehicle V and controls a plurality of devices E mounted on the vehicle V. The plurality of devices E are divided for each control system. Examples of the plurality of control systems include a control system representing a powertrain system (power train system) representing a type of device for efficiently transmitting rotational energy generated in an engine (motor) to a drive wheel, a control system representing a chassis system including a suspension, a steering, and the like, a control system representing an advanced driver-assistance systems (ADAS) or an automatic driving system, and a control system representing a body system including a backlight and the like. It is noted that the ADAS grasps a situation around the vehicle V using various sensors and assists a driver's driving operation. As illustrated in FIG. 1, the plurality of devices E are provided separately for respective areas D of the vehicle V (also referred to as "zones"). Here, the area D indicates a certain range in the vehicle V, and the vehicle V is divided into a plurality of areas D (for example, first area D1 to fourth area D4).

A plurality of devices E are provided in the respective areas D, and the plurality of devices E implement a function in which a safety standard (an automobile safety level) of a predetermined level, that is, an automotive safety integrity level (ASIL) is set. That is, ASIL is set for each function of the vehicle V, and the plurality of devices E implement the function having ASIL set therein. Here, ASIL represents a safety standard of the vehicle V defined in the ISO 26262 standard, and includes four stages of ASIL-A to ASIL-D according to the level of a safety standard. In ASIL, a level of a safety standard becomes higher from ASIL-A toward ASIL-D. That is, ASIL-D has the highest level of the safety standard, ASIL-C has the second highest level of the safety standard, ASIL-B has the third highest level of the safety standard, and ASIL-A has the lowest level of the safety standard. The vehicle system 1 controls each device E that implements a function defined by ASIL, and the vehicle system 1 will be described in detail below.

The vehicle system 1 includes a telematics control unit (TCU) 10, the plurality of devices E, a device controller 20, a central ECU 30 serving as a central controller, and a network branch unit 40 serving as a relay unit.

The TCU 10 is a wireless communication device capable of communicating with an external device provided outside the vehicle V. The TCU 10 wirelessly connects the vehicle V to an external device of the vehicle V via an antenna, and transmits and receives a signal between the vehicle V and the external device of the vehicle V. The TCU 10 wirelessly communicates with the external device by various types of wireless communication such as wide-area wireless communication and narrow-area wireless communication. The TCU 10 is connected to the network branch unit 40 and outputs a signal received from the external device to the network branch unit 40. In addition, the TCU 10 transmits a signal output from the network branch unit 40 to the external device.

The plurality of devices E are mounted on the vehicle V and execute various types of processing for controlling the vehicle V. As described above, the devices E are provided separately for the respective areas D of the vehicle V. In the respective areas D, the devices E of different control systems are mixed. The respective areas D include, for example, at least one of the device E of the powertrain system (power train system), the device E of the chassis system, the device E of an ADAS or the automatic driving system, the device E of the body system, and the like.

The device controller 20 controls the plurality of devices E, and includes a plurality of zone ECUs 21 to 24. The plurality of zone ECUs 21 to 24 are provided to be divided for the respective areas D.

Figure 3:
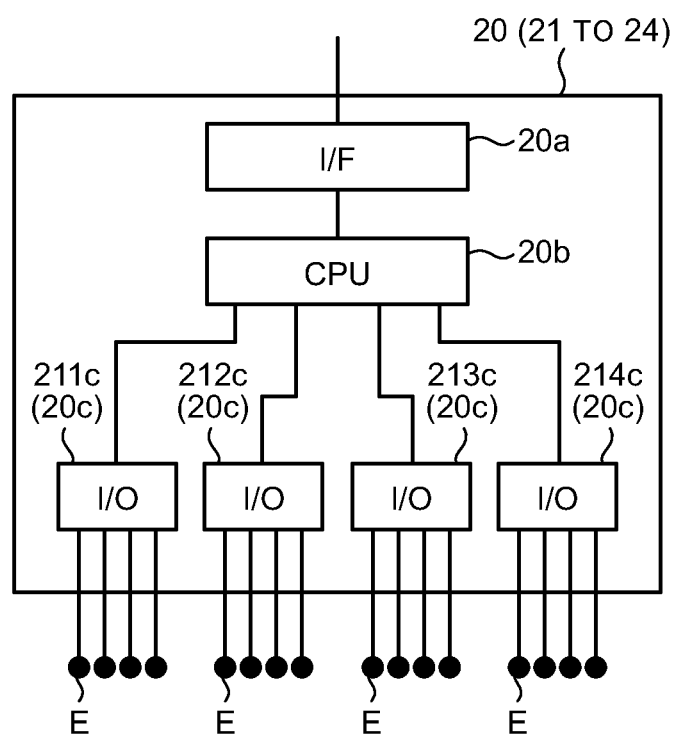
FIG. 3 is a block diagram illustrating a configuration example of a zone ECU according to the embodiment.

The zone ECU 21 is provided in the first area D1 and is connected to at least one device E among the device E of the power train system, the device E of the chassis system, the device E of the ADAS or the automatic driving system, the device E of the body system, and the like, and the devices E of different control systems are connected to each other in a mixed manner. The zone ECU 21 includes, for example, an I/F 20a, a CPU 20b, and an I/O 20c, as illustrated in FIG. 3.

The I/F 20a defines a connector shape of a connection cable, and further defines a signal format, a communication protocol, a signal processing procedure, and the like. The I/F 20a is connected to the CPU 20b and the network branch unit 40, and outputs a signal output from the CPU 20b to the network branch unit 40. In addition, the I/F 20a outputs a signal output from the network branch unit 40 to the CPU 20b.

The CPU 20b controls the plurality of devices E. The CPU 20b is connected to the I/O 20c and the I/F 20a, and outputs a signal output from the device E via the I/O 20c to the I/F 20a. In addition, the CPU 20b controls, based on the signal output from the I/F 20a, the devices E via the I/O 20c.

The I/O 20c is an input/output circuit capable of inputting and outputting a signal. The I/O 20c includes an I/O 211c, an I/O 212c, an I/O 213c, and an I/O 214c. The I/O 211c to the I/O 214c are respectively connected to the devices E that implement functions in which different ASILs are set. Specifically, the I/O 211c is connected to the device E that implements a function in which ASIL-A is set, the I/O 212c is connected to the device E that implements a function in which ASIL-B is set, the I/O 213c is connected to the device E that implements a function in which ASIL-C is set, and the I/O 214c is connected to the device E that implements a function in which ASIL-D is set. The I/O 211c to the I/O 214c are respectively connected to the plurality of devices E and the CPU 20b, and output, to the CPU 20b, signals respectively output from the plurality of devices E. In addition, the I/O 211c to the I/O 214c output a signal output from the CPU 20b to the plurality of devices E. The zone ECU 21 configured as described above transmits an input signal S1 from the devices E to the network branch unit 40.

In addition, the zone ECU 21 controls the devices E based on an output signal S4 transmitted from the network branch unit 40.

The zone ECU 22 is provided in the second area D2, and is connected to at least one device E among the device E of the power train system, the device E of the chassis system, the device E of the ADAS or the automatic driving system, the device E of the body system, and the like, and the devices E of different control systems are connected to each other in a mixed manner. The zone ECU 22 includes, for example, the I/F 20*a*, the CPU 20*b*, and the I/O 20*c*, as illustrated in FIG. 3. It is noted that the specific configurations of the I/F 20*a*, the CPU 20*b*, and the I/O 20*c* have been described with the zone ECU 21, and descriptions thereof will be omitted here. The zone ECU 22 transmits the input signal S1 from the devices E to the network branch unit 40. In addition, the zone ECU 22 controls the devices E based on the output signal S4 transmitted from the network branch unit 40.

The zone ECU 23 is provided in the third area D3, and is connected to at least one device E among the device E of the power train system, the device E of the chassis system, the device E of the ADAS or the automatic driving system, the device E of the body system, and the like, and the devices E of different control systems are connected to each other in a mixed manner. The zone ECU 23 includes, for example, the I/F 20*a*, the CPU 20*b*, and the I/O 20*c*, as illustrated in FIG. 3. It is noted that the specific configurations of the I/F 20*a*, the CPU 20*b*, and the I/O 20*c* have been described with the zone ECU 21, and descriptions thereof will be omitted here. The zone ECU 23 transmits the input signal S1 from the devices E to the network branch unit 40. In addition, the zone ECU 23 controls the devices E based on the output signal S4 transmitted from the network branch unit 40.

The zone ECU 24 is provided in the fourth area D4, and is connected to at least one device E among the device E of the power train system, the device E of the chassis system, the device E of the ADAS or the automatic driving system, the device E of the body system, and the like, and the devices E of different control systems are connected to each other in a mixed manner. The zone ECU 24 includes, for example, the I/F 20*a*, the CPU 20*b*, and the I/O 20*c*, as illustrated in FIG. 3. It is noted that the specific configurations of the I/F 20*a*, the CPU 20*b*, and the I/O 20*c* have been described with the zone ECU 21, and descriptions thereof will be omitted here. The zone ECU 24 transmits the input signal S1 from the devices E to the network branch unit 40. In addition, the zone ECU 24 controls the devices E based on the output signal S4 transmitted from the network branch unit 40.

Next, the central ECU 30 will be described. The central ECU 30 includes confirmation processing related to a safety standard (ASIL) for the plurality of devices E and executes appropriate control. The central ECU 30 includes a plurality of ECUs allocated one by one for each level of a safety standard and configured to be able to execute, on the device E, the confirmation processing according to the allocated level. Specifically, the central ECU 30 includes, as the plurality of ECUs, an ASIL-A ECU 31, an ASIL-B ECU 32, an ASIL-C ECU 33, and an ASIL-D ECU 34.

Figure 5:
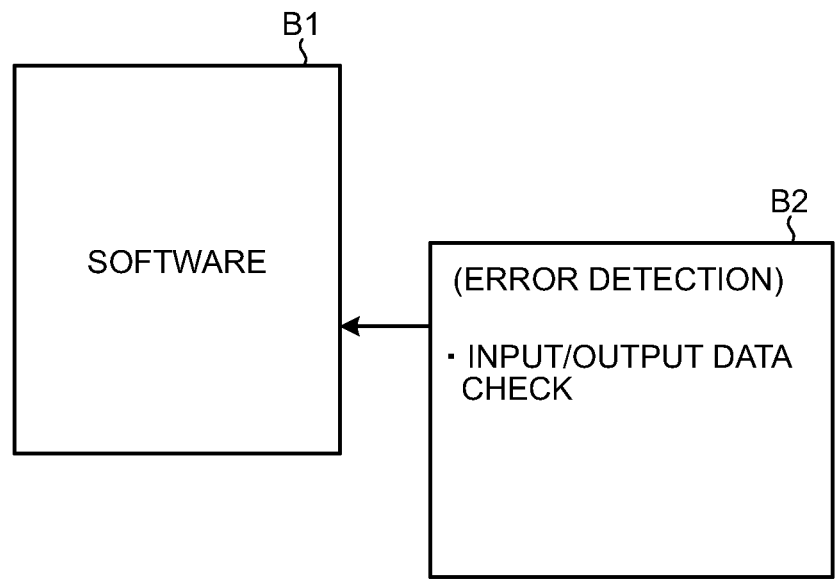
FIG. 5 is a diagram illustrating a configuration example of software of ASIL-A according to the embodiment.

The ASIL-A ECU 31 is an integrated ECU that includes confirmation processing related to ASIL-A for a plurality of devices E, executes appropriate control, and integrates individual ECUs. The ASIL-A ECU 31 includes an electronic circuit mainly including a known microcomputer including a CPU, a ROM and a RAM constituting a storage unit, and an interface. The ASIL-A ECU 31 executes the confirmation processing related to ASIL-A on data included in an input signal S2 (a level integration frame F21 to be described later) transmitted from the device E that implements a function in which ASIL-A, among the ASILs, having the lowest level of a safety standard is set. The functions in which ASIL-A is set include, for example, a navigation function, a function of turning on a backlight, and the like, as illustrated in FIG. 4. The ASIL-A ECU 31 executes confirmation processing according to the level of the safety standard (ASIL-A) allocated to the ASIL-A ECU 31 on the data included in the input signal S2 transmitted from the device E that implements the navigation function, the function of turning on the backlight, and the like. For example, as illustrated in FIG. 5, the ASIL-A ECU 31 executes an error detection B2 including checking of input/output data as the confirmation processing according to ASIL-A. The ASIL-A ECU 31 executes the error detection B2 on software B1 that executes normal processing (for example, navigation processing and backlight lighting processing) to check the input/output data. When a confirmation result is normal, the ASIL-A ECU 31 transmits, to the network branch unit 40, an output signal S3 indicating that the confirmation result is normal, and when the confirmation result is abnormal, the ASIL-A ECU 31 transmits, to the network branch unit 40, an output signal S3 indicating that the confirmation result is abnormal.

Figure 6:
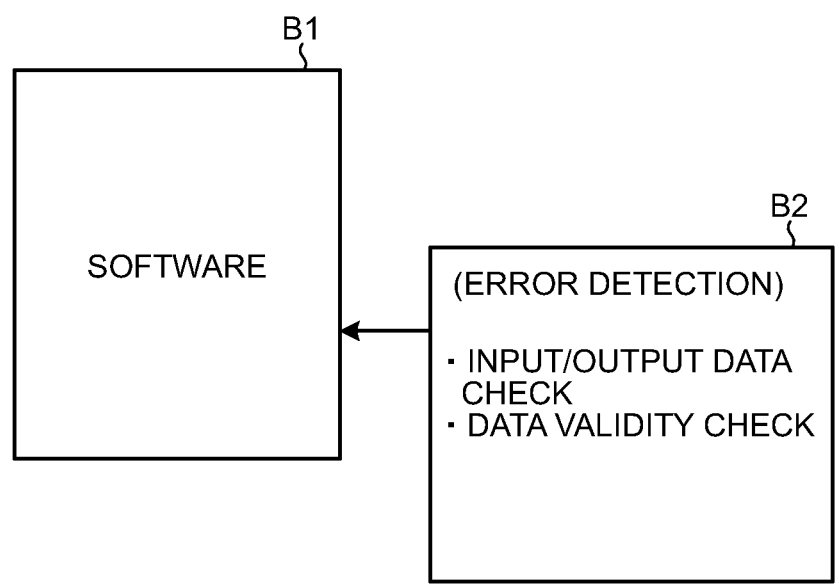
FIG. 6 is a diagram illustrating a configuration example of software of ASIL-B according to the embodiment.

The ASIL-B ECU 32 is an integrated ECU that includes confirmation processing related to ASIL-B for a plurality of devices E, executes appropriate control, and integrates individual ECUs. The ASIL-B ECU 32 includes an electronic circuit mainly including a known microcomputer including a CPU, a ROM and a RAM constituting a storage unit, and an interface. In general, the ASIL-B ECU 32 has higher performance (higher number of clocks in the CPU) than that of the ASIL-A ECU 31. The ASIL-B ECU 32 executes the confirmation processing related to ASIL-B on data included in an input signal S2 (a level integration frame F22 to be described later) transmitted from the device E that implements a function in which ASIL-B, among the ASILS, having the third highest level of a safety standard is set. The functions in which ASIL-B is set include, for example, a rear-view camera function, a function of assisting backward driving, and the like, as illustrated in FIG. 4. The ASIL-B ECU 32 executes confirmation processing according to the level of the safety standard (ASIL-B) allocated to the ASIL-B ECU 32 on the data included in the input signal S2 transmitted from the device E that implements the rear-view camera function, the function of assisting backward driving, and the like. For example, as illustrated in FIG. 6, the ASIL-B ECU 32 executes an error detection B2 including an input/output data check and a data validity check as the confirmation processing according to ASIL-B. The ASIL-B ECU 32 executes the error detection B2 on the software B1 that executes normal processing (for example, the rear-view camera function and the function of assisting backward driving) to confirm the input/output data check and the data validity check. When a confirmation result is normal, the ASIL-B ECU 32 transmits, to the network branch unit 40, an output signal S3 indicating that the confirmation result is normal, and when the confirmation result is abnormal, the ASIL-B ECU 32 transmits, to the network branch unit 40, an output signal S3 indicating that the confirmation result is abnormal.

Figure 7:
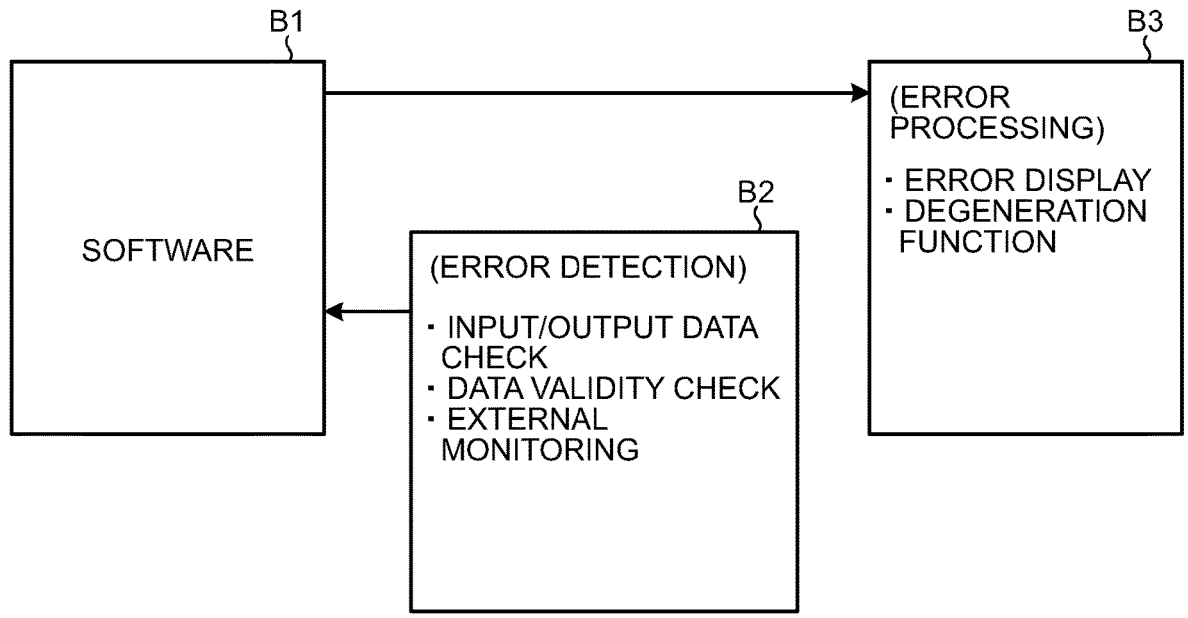
FIG. 7 is a diagram illustrating a configuration example of software of ASIL-C according to the embodiment.

The ASIL-C ECU 33 is an integrated ECU that includes confirmation processing related to ASIL-C for a plurality of devices E, executes appropriate control, and integrates individual ECUs. The ASIL-C ECU 33 includes an electronic circuit mainly including a known microcomputer including a CPU, a ROM and a RAM constituting a storage unit, and an interface. In general, the ASIL-C ECU 33 has higher performance (higher number of clocks in the CPU) than that of the ASIL-B ECU 32. The ASIL-C ECU 33 executes the confirmation processing related to ASIL-C on data included in an input signal S2 (a level integration frame F23 to be described later) transmitted from the device E that implements a function in which ASIL-C, among the ASILS, having the second highest level of a safety standard is set. The functions in which ASIL-C is set include, for example, a vehicle-to-vehicle communication function, a road-to-vehicle communication function, and the like, as illustrated in FIG. 4. The ASIL-C ECU 33 executes confirmation processing according to the level of the safety standard (ASIL-C) allocated to the ASIL-C ECU 33 on the data included in the input signal S2 transmitted from the device E that implements the vehicle-to-vehicle communication function, the road-to-vehicle communication function, and the like. For example, as illustrated in FIG. 7, the ASIL-C ECU 33 executes an error detection B2 including an input/output data check, a data validity check, and an external monitoring as confirmation processing according to ASIL-C, and further executes an error processing B3 including an error display and a degeneration function. The ASIL-C ECU 33 executes the error detection B2 on software B1 that executes normal processing (for example, the vehicle-to-vehicle communication function and the road-to-vehicle communication function) to confirm the input/output data check, the data validity check, and the external monitoring check. Further, when a confirmation result is normal, the ASIL-C ECU 33 transmits, to the network branch unit 40, an output signal S3 indicating that the confirmation result is normal, and when the confirmation result is abnormal, the ASIL-C ECU 33 executes the error processing B3 and transmits, to the network branch unit 40, an output signal S3 indicating that the error display or the degeneration operation is executed.

Figure 8:
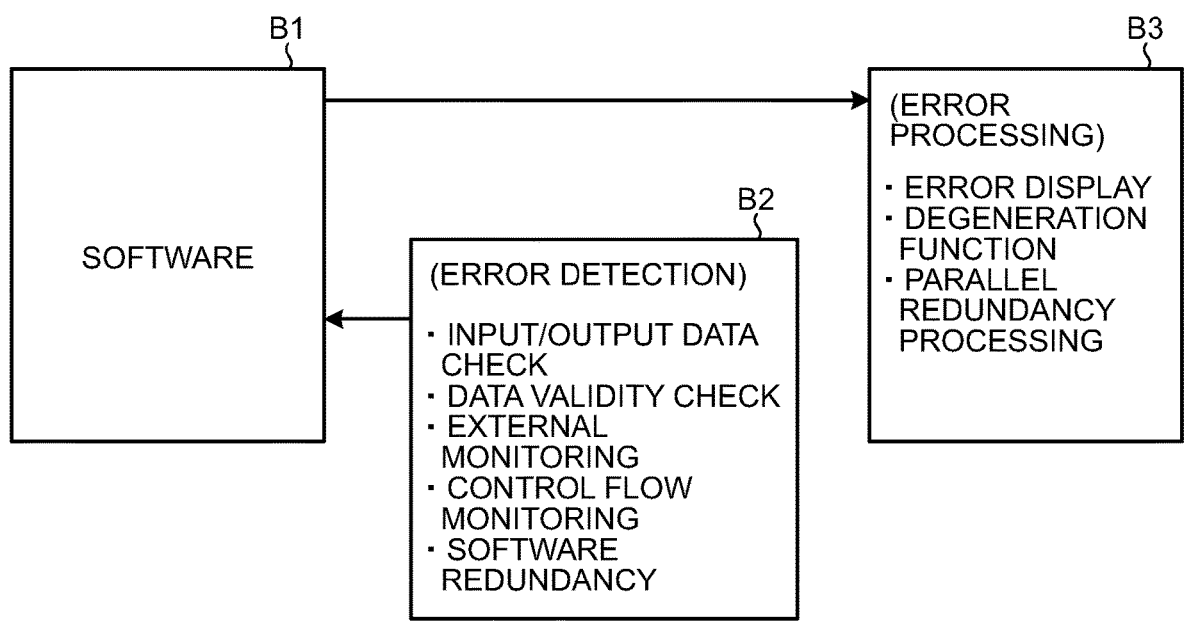
FIG. 8 is a diagram illustrating a configuration example of software of ASIL-D according to the embodiment.

The ASIL-D ECU 34 is an integrated ECU that includes confirmation processing related to ASIL-D for a plurality of devices E, executes appropriate control, and integrates individual ECUs. The ASIL-D ECU 34 includes an electronic circuit mainly including a known microcomputer including a CPU, a ROM and a RAM constituting a storage unit, and an interface. In general, the ASIL-D ECU 34 has higher performance (higher number of clocks in the CPU) than that of the ASIL-C ECU 33. The ASIL-D ECU 34 executes the confirmation processing related to ASIL-D on data included in an input signal S2 (a level integration frame F24 to be described later) transmitted from the device E that implements a function in which ASIL-D, among the ASILS, having the highest level of a safety standard is set. The functions in which ASIL-D is set include, for example, an anti-lock brake function, an electric power steering function, and the like, as illustrated in FIG. 4. The ASIL-D ECU 34 executes confirmation processing according to the level of the safety standard (ASIL-D) allocated to the ASIL-D ECU 34 on the data included in the input signal S2 transmitted from the device E that implements the anti-lock brake function, the electric power steering function, and the like. For example, as illustrated in FIG. 8, the ASIL-D ECU 34 executes an error detection B2 including an input/output data check, a data validity check, an external monitoring, a control flow monitoring, and a software redundancy as the confirmation processing according to ASIL-D, and further executes an error processing B3 including an error display, a degeneration function, and parallel redundancy processing. The ASIL-D ECU 34 executes the error detection B2 on software B1 that executes normal processing (for example, the anti-lock brake function and the electric power steering function) to confirm the input/output data check, the data validity check, the external monitoring check, the control flow monitoring check, and the software redundancy check. Further, when a confirmation result is normal, the ASIL-D ECU 34 transmits, to the network branch unit 40, an output signal S3 indicating that the confirmation result is normal, and when the confirmation result is abnormal, the ASIL-D ECU 34 executes the error processing B3 to transmit, to the network branch unit 40, an output signal S3 indicating that the error display, the degeneration operation, and the parallel redundancy processing are executed.

Next, the configuration of the confirmation processing according to each of the safety standards will be described. Processing related to a safety standard having a relatively high level includes at least a part of processing related to a safety standard having a relatively low level. For example, as illustrated in FIGS. 5 to 8, the processing (the error detection B2 and the error processing B3) related to the safety standard (ASIL-D) having the highest level includes all types of processing (the error detection B2 and the error processing B3) related to the safety standards (ASIL-A, ASIL-B, and ASIL-C) having a relatively low level. As illustrated in FIGS. 5 to 7, the processing (the error detection B2 and the error processing B3) related to the safety standard (ASIL-C) having the second highest level includes all types of processing (the error detection B2) related to the safety standards (ASIL-A and ASIL-B) having a relatively low level. In addition, as illustrated in FIGS. 5 and 6, the processing (the error detection B2) related to the safety standard (ASIL-B) having the third highest level includes all types of processing (the error detection B2) related to the safety standard (ASIL-A) having a relatively low level.

Next, the network branch unit 40 will be described. The network branch unit 40 relays a signal between the device controller 20 (the plurality of zone ECUs 21 to 24) and the central ECU 30. The network branch unit 40 relays, between the device controller 20 and the central ECU 30, for example, an input signal S1 related to the confirmation processing from the device E, the input signal S1 being transmitted from the device controller 20, and an output signal S3 related to the confirmation processing from the central ECU 30, the output signal S3 being transmitted from the central ECU 30. The network branch unit 40 includes a signal integration unit 41 and a signal distribution unit 42.

The signal integration unit 41 generates, in a plurality of signals, an integrated frame obtained by integrating pieces of data included in respective frames constituting the signals. For example, the signal integration unit 41 integrates, for respective levels, pieces of data extracted for the respective levels from pieces of data included in a plurality of input frames F1 constituting the input signals S1 from the devices E, the input signals S1 being respectively transmitted from the plurality of zone ECUs 21 to 24, thereby generating the level integration frames F2 for the respective levels. Here, as illustrated in FIG. 9, the plurality of input frames F1 constituting the input signals S1 from the devices E include a plurality of data areas. Specifically, the input frame F1 is configured by including data areas "frame start" representing the start of a frame, "transmission source ID: zone ECU ◯◯" representing an identifier of a transmission source, "transmission destination ID: network branch unit" representing an identifier of a transmission destination, "ASIL-A", "ASIL-B", "ASIL-C", and "ASIL-D" respectively representing data areas from ASIL-A to ASIL-D, "error detection and correction area" representing error detection and a correction area, and "frame end" representing an end of a frame. Data from the device E that implements a function in which ASIL-A is set is stored in the data area of "ASIL-A", data from the device E that implements a function in which ASIL-B is set is stored in the data area of "ASIL-B", data from the device E that implements a function in which ASIL-C is set is stored in the data area of "ASIL-C", and data from the device E that implements a function in which ASIL-D is set is stored in the data area of "ASIL-D". In FIG. 9, four input frames F1 (F11 to F14) are illustrated, and each of the input frames F1 corresponds to a frame transmitted from each of the zone ECUs 21 to 24. For example, the input frame F11, the transmission source ID of which is the zone ECU 21, corresponds to a frame transmitted from the zone ECU 21, the input frame F12, the transmission source ID of which is the zone ECU 22, corresponds to a frame transmitted from the zone ECU 22, the input frame F13, the transmission source ID of which is the zone ECU 23, corresponds to a frame transmitted from the zone ECU 23, and the input frame F14, the transmission source ID of which is the zone ECU 24, corresponds to a frame transmitted from the zone ECU 24.

The signal integration unit 41 extracts pieces of data for the respective levels of the safety standards (ASIL-A to ASIL-D) from the data areas included in the plurality of input frames F1 (F11 to F14) transmitted from the plurality of zone ECUs 21 to 24. Then, the signal integration unit 41 integrates, for the respective levels, the pieces of data extracted for the respective levels of the safety standards, thereby generating the level integration frames F2 (F21 to F24) for the respective levels. As illustrated in FIG. 10, the level integration frame F2 includes a plurality of data areas. Specifically, the level integration frame F2 is configured by including data areas "frame start" representing the start of a frame, "transmission source ID: network branch unit" representing an identifier of a transmission source, "transmission destination ID: ASIL-○ ECU ○○" representing an identifier of a transmission destination, "zone ECU 21", "zone ECU 22", "zone ECU 23", and "zone ECU 24" respectively representing data areas from the zone ECU 21 to the zone ECU 24, "error detection and correction area" representing error detection and a correction area, and "frame end" representing an end of a frame.

For example, in the four input frames F1 (F11 to F14) illustrated in FIG. 9, the signal integration unit 41 distinguishes and extracts, for the respective levels of the safety standards, data included in the data area of ASIL-A, data included in the data area of ASIL-B, data included in the data area of ASIL-C, and data included in the data area of ASIL-D. Then, as illustrated in FIG. 10, the signal integration unit 41 integrates, for the respective same levels, the pieces of data extracted for the respective levels (ASIL-A to ASIL-D) of the safety standards, thereby generating the level integration frames F2 (F21 to F24) for the respective levels.

For example, in the four input frames F1 (F11 to F14) illustrated in FIG. 9, the signal integration unit 41 integrates (aggregates) all the pieces of data included in the data area of ASIL-A into the level integration frame F21, the transmission destination ID of which is the ASIL-A ECU 31. At this time, the signal integration unit 41 stores the data of ASIL-A transmitted from each of the zone ECUs 21 to 24 in the corresponding data area in the data area divided for each of the zone ECUs 21 to 24 in the level integration frame F21. For example, the signal integration unit 41 stores the data of ASIL-A transmitted from the zone ECU 21 in a data area divided into the zone ECU 21 in the level integration frame F21 (transmission destination ID: ASIL-A ECU 31), stores the data of ASIL-A transmitted from the zone ECU 22 in a data area divided into the zone ECU 22 in the level integration frame F21, stores the data of ASIL-A transmitted from the zone ECU 23 in a data area divided into the zone ECU 23 in the level integration frame F21, and stores the data of ASIL-A transmitted from the zone ECU 24 in a data area divided into the zone ECU 24 in the level integration frame F21.

For example, in the four input frames F1 (F11 to F14) illustrated in FIG. 9, the signal integration unit 41 integrates (aggregates) all the pieces of data included in the data area of ASIL-B into the level integration frame F22, the transmission destination ID of which is the ASIL-B ECU 32. For example, the signal integration unit 41 stores the data of ASIL-B transmitted from the zone ECU 21 in a data area divided into the zone ECU 21 in the level integration frame F22 (transmission destination ID: ASIL-B ECU 32), stores the data of ASIL-B transmitted from the zone ECU 22 in a data area divided into the zone ECU 22 in the level integration frame F22, stores the data of ASIL-B transmitted from the zone ECU 23 in a data area divided into the zone ECU 23 in the level integration frame F22, and stores the data of ASIL-B transmitted from the zone ECU 24 in a data area divided into the zone ECU 24 in the level integration frame F22.

For example, in the four input frames F1 (F11 to F14) illustrated in FIG. 9, the signal integration unit 41 integrates (aggregates) all the pieces of data included in the data area of ASIL-C into the level integration frame F23, the transmission destination ID of which is the ASIL-C ECU 33. For example, the signal integration unit 41 stores the data of ASIL-C transmitted from the zone ECU 21 in a data area divided into the zone ECU 21 in the level integration frame F23 (transmission destination ID: ASIL-C ECU 33), stores the data of ASIL-C transmitted from the zone ECU 22 in a data area divided into the zone ECU 22 in the level integration frame F23, stores the data of ASIL-C transmitted from the zone ECU 23 in a data area divided into the zone ECU 23 in the level integration frame F23, and stores the data of ASIL-C transmitted from the zone ECU 24 in a data area divided into the zone ECU 24 in the level integration frame F23.

For example, in the four input frames F1 (F11 to F14) illustrated in FIG. 9, the signal integration unit 41 integrates (aggregates) all the pieces of data included in the data area of ASIL-D into the level integration frame F24, the transmission destination ID of which is the ASIL-D ECU 34. For example, the signal integration unit 41 stores the data of ASIL-D transmitted from the zone ECU 21 in a data area divided into the zone ECU 21 in the level integration frame F24 (transmission destination ID: ASIL-D ECU 34), stores the data of ASIL-D transmitted from the zone ECU 22 in a data area divided into the zone ECU 22 in the level integration frame F24, stores the data of ASIL-D transmitted from the zone ECU 23 in a data area divided into the zone ECU 23 in the level integration frame F24, and stores the data of ASIL-D transmitted from the zone ECU 24 in a data area divided into the zone ECU 24 in the level integration frame F24.

As described above, the signal integration unit 41 integrates, for the respective levels, the pieces of data extracted for the respective levels (ASIL-A to ASIL-D) from the pieces of data included in the plurality of input frames F1 constituting the input signals S1 from the devices E, the input signals S1 being respectively transmitted from the plurality of zone ECUs 21 to 24, thereby generating the level integration frames F2 (F21 to F24) for the respective levels.

Next, a description will be given as to an example in which the signal integration unit 41 integrates pieces of data included in a plurality of frames constituting the output signals S3 respectively transmitted from the ASIL ECUs 31 to 34. For example, the signal integration unit 41 integrates, for the respective zone ECUs 21 to 24, each of which serves as a transmission destination, pieces of data extracted for the respective zone ECUs 21 to 24, each of which serves as the transmission destination, from pieces of data included in a plurality of output frames F3 constituting the output signals S3 from the ASIL ECUs 31 to 34, the output signals S3 being respectively transmitted from the plurality of ASIL ECUs 31 to 34, thereby generating transmission destination integration frames F4 for the respective zone ECUs 21 to 24, each of which serves as the transmission destination. Here, the zone ECUs 21 to 24, each of which serves as the transmission destination, are the zone ECUs 21 to 24 that have respectively transmitted the input signals S1 from the devices E subjected to the confirmation processing.

As illustrated in FIG. 11, the plurality of output frames F3 (F31 to F34) constituting the output signals S3 from the ASIL ECUs 31 to 34 include a plurality of data areas. Specifically, each output frame F3 is configured by including data areas "frame start" representing the start of a frame, "transmission source ID: ASIL-○ ECU ○○" representing an identifier of a transmission source, "transmission destination ID: network branch unit" representing an identifier of a transmission destination, "zone ECU 21", "zone ECU 22", "zone ECU 23", and "zone ECU 24" respectively representing data areas from the zone ECU 21 to the zone ECU 24, "error detection and correction area" representing error detection and a correction area, and "frame end" representing an end of a frame. Data in which the transmission destination is the zone ECU 21 is stored in the data area of the "zone ECU 21", data in which the transmission destination is the zone ECU 22 is stored in the data area of the "zone ECU 22", data in which the transmission destination is the zone ECU 23 is stored in the data area of the "zone ECU 23", and data in which the transmission destination is the zone ECU 24 is stored in the data area of the "zone ECU 24". In FIG. 11, four output frames F3 (F31 to F34) are illustrated, and each of the output frames F3 (F31 to F34) corresponds to a frame transmitted from each of the ASIL ECUs 31 to 34. For example, the output frame F31, the transmission source ID of which is the ASIL-A ECU 31, corresponds to a frame transmitted from the ASIL-A ECU 31, the output frame F32, the transmission source ID of which is the ASIL-B ECU 32, corresponds to a frame transmitted from the ASIL-B ECU 32, the output frame F33, the transmission source ID of which is the ASIL-C ECU 33, corresponds to a frame transmitted from the ASIL-C ECU 33, and the output frame F34, the transmission source ID of which is the ASIL-D ECU 34, corresponds to a frame transmitted from the ASIL-D ECU 34.

The signal integration unit 41 extracts pieces of data for the respective zone ECUs 21 to 24 from data areas included in the plurality of output frames F3 (F31 to F34) transmitted from the plurality of ASIL ECUs 31 to 34. Then, the signal integration unit 41 integrates the extracted pieces of data for the respective zone ECUs 21 to 24, thereby generating transmission destination integration frames F4 (F41 to F44) for the respective zone ECUs 21 to 24. Here, as illustrated in FIG. 12, the transmission destination integration frames F4 (F41 to F44) include a plurality of data areas. Specifically, each of the transmission destination integration frames F4 is configured by including data areas "frame start" representing the start of a frame, "transmission source ID: network branch unit" representing an identifier of a transmission source, "transmission destination ID: zone ECU ○○" representing an identifier of a transmission destination, "ASIL-A", "ASIL-B", "ASIL-C", and "ASIL-D" respectively representing data areas from ASIL-A to ASIL-D, "error detection and correction area" representing error detection and a correction area, and "frame end" representing an end of a frame.

For example, in the four output frames F3 (F31 to F34) illustrated in FIG. 11, the signal integration unit 41 extracts data included in the data area of the zone ECU 21, data included in the data area of the zone ECU 22, data included in the data area of the zone ECU 23, and data included in the data area of the zone ECU 24 separately for the respective zone ECUs 21 to 24. Then, as illustrated in FIG. 12, the signal integration unit 41 integrates, for the respective same transmission destinations, the pieces of data respectively extracted for the respective zone ECUs 21 to 24, thereby generating the transmission destination integration frames F4 (F41 to F44) for the respective transmission destinations.

For example, in the four output frames F3 (F31 to F34) illustrated in FIG. 11, the signal integration unit 41 integrates (aggregates) all the pieces of data included in the data area of the zone ECU 21 into the transmission destination integration frame F41 having the zone ECU 21 as the transmission destination ID. At this time, the signal integration unit 41 stores data addressed to the zone ECU 21, the data being transmitted from each of the ASIL ECUS 31 to 34, in the corresponding data area in the data area divided for each of ASIL-A to ASIL-D in the transmission destination integration frame F41. For example, the signal integration unit 41 stores data of the zone ECU 21, the data being transmitted from the ASIL-A ECU 31, in a data area divided into ASIL-A in the transmission destination integration frame F41 (transmission destination ID: zone ECU 21), stores data of the zone ECU 21, the data being transmitted from the ASIL-B ECU 32, in a data area divided into ASIL-B in the transmission destination integration frame F41, stores data of the zone ECU 21, the data being transmitted from the ASIL-C ECU 33, in a data area divided into ASIL-C in the transmission destination integration frame F41, and stores data of the zone ECU 21, the data being transmitted from the ASIL-D ECU 34, in a data area divided into ASIL-D in the transmission destination integration frame F41.

Further, for example, in the four output frames F3 (F31 to F34) illustrated in FIG. 11, the signal integration unit 41 integrates (aggregates) all the pieces of data included in the data area of the zone ECU 22 into the transmission destination integration frame F42 having the zone ECU 22 as the transmission destination ID. At this time, the signal integration unit 41 stores data addressed to the zone ECU 22, the data being transmitted from each of the ASIL ECUs 31 to 34, in the corresponding data area in the data area divided for each of ASIL-A to ASIL-D in the transmission destination integration frame F42. For example, the signal integration unit 41 stores data of the zone ECU 22, the data being transmitted from the ASIL-A ECU 31, in a data area divided into ASIL-A in the transmission destination integration frame F42 (transmission destination ID: zone ECU 22), stores data of the zone ECU 22, the data being transmitted from the ASIL-B ECU 32, in a data area divided into ASIL-B in the transmission destination integration frame F42, stores data of the zone ECU 22, the data being transmitted from the ASIL-C ECU 33, in a data area divided into ASIL-C in the transmission destination integration frame F42, and stores data of the zone ECU 22, the data being transmitted from the ASIL-D ECU 34, in a destination integration frame F42.

Further, for example, in the four output frames F3 (F31 to F34) illustrated in FIG. 11, the signal integration unit 41 integrates (aggregates) all the pieces of data included in the data area of the zone ECU 23 into the transmission destination integration frame F43 having the zone ECU 23 as the transmission destination ID. At this time, the signal integration unit 41 stores data addressed to the zone ECU 23, the data being transmitted from each of the ASIL ECUs 31 to 34, in the corresponding data area in the data area divided for each of ASIL-A to ASIL-D in the transmission destination integration frame F43. For example, the signal integration unit 41 stores data of the zone ECU 23, the data being transmitted from the ASIL-A ECU 31, in a data area divided into ASIL-A in the transmission destination integration frame F43 (transmission destination ID: zone ECU 23), stores data of the zone ECU 23, the data being transmitted from the ASIL-B ECU 32, in a data area divided into ASIL-B in the transmission destination integration frame F43, stores data of the zone ECU 23, the data being transmitted from the ASIL-C ECU 33, in a data area divided into ASIL-C in the transmission destination integration frame F43, and stores data of the zone ECU 23, the data being transmitted from the ASIL-D ECU 34, in a destination integration frame F43.

Further, for example, in the four output frames F3 (F31 to F34) illustrated in FIG. 11, the signal integration unit 41 integrates (aggregates) all the pieces of data included in the data area of the zone ECU 24 into the transmission destination integration frame F44 having the zone ECU 24 as the transmission destination ID. At this time, the signal integration unit 41 stores data addressed to the zone ECU 24, the data being transmitted from each of the ASIL ECUs 31 to 34, in the corresponding data area in the data area divided for each of ASIL-A to ASIL-D in the transmission destination integration frame F44. For example, the signal integration unit 41 stores data of the zone ECU 24, the data being transmitted from the ASIL-A ECU 31, in a data area divided into ASIL-A in the transmission destination integration frame F44 (transmission destination ID: zone ECU 24), stores data of the zone ECU 24, the data being transmitted from the ASIL-B ECU 32, in a data area divided into ASIL-B in the transmission destination integration frame F44, stores data of the zone ECU 24, the data being transmitted from the ASIL-C ECU 33, in a data area divided into ASIL-C in the transmission destination integration frame F44, and stores data of the zone ECU 24, the data being transmitted from the ASIL-D ECU 34, in a destination integration frame F44.

As described above, the signal integration unit 41 integrates, for the respective zone ECUs 21 to 24, each of which serves as a transmission destination, the pieces of data extracted for the respective zone ECUs 21 to 24, each of which serves as the transmission destination, from the pieces of data included in the plurality of output frames F3 constituting the output signals S3 from the ASIL ECUS 31 to 34, the output signals S3 being respectively transmitted from the plurality of ASIL ECUs 31 to 34, thereby generating the transmission destination integration frames F4 for the respective zone ECUs 21 to 24, each of which serves as the transmission destination.

Next, the signal distribution unit 42 will be described. The signal distribution unit 42 distributes and transmits a signal according to a transmission destination. For example, the signal distribution unit 42 distributes and transmits the input signals S1 from the devices E, the input signals S being respectively transmitted from the plurality of zone ECUs 21 to 24, to the ASIL ECUs 31 to 34, each of which has a level allocated thereto and configured to correspond to a function of the device E. In this example, the signal distribution unit 42 distributes and transmits each of the level integration frames F2 (F21 to F24) generated by the signal integration unit 41 based on the input signal S1 to a corresponding one of the ASIL ECUS 31 to 34 each having a corresponding level allocated thereto. For example, the signal distribution unit 42 distributes and transmits the level integration frame F21 (transmission destination ID: ASIL-A ECU 31) generated by the signal integration unit 41 to the ASIL-A ECU 31 to which ASIL-A is allocated as confirmation processing related to the safety standard. The signal distribution unit 42 distributes and transmits the level integration frame F22 (transmission destination ID: ASIL-B ECU 32) generated by the signal integration unit 41 to the ASIL-B ECU 32 to which ASIL-B is allocated as confirmation processing related to the safety standard. The signal distribution unit 42 distributes and transmits the level integration frame F23 (transmission destination ID: ASIL-C ECU 33) generated by the signal integration unit 41 to the ASIL-C ECU 33 to which ASIL-C is allocated as confirmation processing related to the safety standard. The signal distribution unit 42 distributes and transmits the level integration frame F24 (transmission destination ID: ASIL-D ECU 34) generated by the signal integration unit 41 to the ASIL-D ECU 34 to which ASIL-D is allocated as confirmation processing related to the safety standard. Then, when transmitting the level integration frames F21 to F24, the signal distribution unit 42 preferentially transmits the input signal S1 with respect to the ASIL ECUS 33 and 34 having a relatively high allocated level, that is, the level integration frames F23 and F24 based on the input signal S1 over the input signal S1 with respect to the ASIL ECUs 31 and 32 having a relatively low allocated level, that is, the level integration frames F21 and F22 based on the input signal S1.

In addition, the signal distribution unit 42 distributes and transmits the output signals S3 from the ASIL ECUs 31 to 34, the output signals S3 being respectively transmitted from the ASIL ECUS 31 to 34, to the zone ECUs 21 to 24 that have respectively transmitted the input signals S1 from the devices E subjected to the confirmation processing. In this example, the signal distribution unit 42 distributes and transmits each of the transmission destination integration frames F4 (F41 to F44) generated by the signal integration unit 41 to a corresponding one of the zone ECUs 21 to 24, each of which serves as a transmission destination. For example, the signal distribution unit 42 distributes and transmits the transmission destination integration frame F41 (transmission destination ID: zone ECU 21) generated by the signal integration unit 41 to the zone ECU 21 that has transmitted the input signal S1 from the device E subjected to the confirmation processing. The signal distribution unit 42 distributes and transmits the transmission destination integration frame F42 (transmission destination ID: zone ECU 22) generated by the signal integration unit 41 to the zone ECU 22 that has transmitted the input signal S1 from the device E subjected to the confirmation processing. The signal distribution unit 42 distributes and transmits the transmission destination integration frame F43 (transmission destination ID: zone ECU 23) generated by the signal integration unit 41 to the zone ECU 23 that has transmitted the input signal S1 from the device E subjected to the confirmation processing. The signal distribution unit 42 distributes and transmits the transmission destination integration frame F44 (transmission destination ID: zone ECU 24) generated by the signal integration unit 41 to the zone ECU 24 that has transmitted the input signal S1 from the device E subjected to the confirmation processing.

Each of the zone ECUs 21 to 24 controls a corresponding one of the devices E connected thereto based on each of the transmission destination integration frame F41 to F44 transmitted from the signal distribution unit 42. For example, the zone ECU 21 controls the device E connected to the zone ECU 21, that is, the device E that implements the function in which ASIL-A to ASIL-D are set, based on the data (the confirmation processing result according to the level of the safety standard, that is, ASIL-A to ASIL-D) stored in the data area of the transmission destination integration frame F41. The zone ECU 22 controls the device E connected to the zone ECU 22 based on the data (the confirmation processing result according to the level of the safety standard) stored in the data area of the transmission destination integration frame F42. The zone ECU 23 controls the device E connected to the zone ECU 23 based on the data (the confirmation processing result according to the level of the safety standard) stored in the data area of the transmission destination integration frame F43. The zone ECU 24 controls the device E connected to the zone ECU 24 based on the data (the confirmation processing result according to the level of the safety standard) stored in the data area of the transmission destination integration frame F44.

Next, an example of communication between respective frames will be described. FIG. 13 is a diagram illustrating an example of communication between respective frames according to the embodiment. The signal integration unit 41 of the network branch unit 40 receives the input frames F11 to F14 respectively transmitted from the zone ECUs 21 to 24 in the upstream communication. The signal integration unit 41 integrates, for respective levels, pieces of data extracted for the respective levels from pieces of data included in the input frames F11 to F14 received at a predetermined constant cycle, thereby generating the level integration frames F21 to F24 for the respective levels. It is noted that, in this example, as illustrated in FIG. 13, the signal integration unit 41 receives the four input frames F11 to F14 at a predetermined constant cycle. However, for example, in a case where only three input frames F11 to F13 are received at a predetermined constant cycle, pieces of data extracted for the respective levels from pieces of data included in the three input frames F11 to F13 may be integrated for the respective levels, thereby generating the level integration frames F21 to F23 for the respective levels. Next, the signal distribution unit 42 distributes and transmits each of the level integration frames F21 to F24 generated by the signal integration unit 41 to a corresponding one of the ASIL ECUs 31 to 34 each having a corresponding level allocated thereto. At this time, when transmitting the level integration frames F21 to F24, the signal distribution unit 42 preferentially transmits the level integration frames F23 and F24 to be respectively transmitted to the ASIL ECUs 33 and 34 having a relatively higher allocated level over the level integration frames F21 and F22 to be respectively transmitted to the ASIL ECUS 31 and 32 having a relatively lower allocated level. For example, the signal distribution unit 42 sequentially transmits the level integration frames F21 to F24, starting from the level integration frame F24 to be transmitted to the ASIL-D ECU 34 having the highest allocated level. Specifically, the signal distribution unit 42 first transmits the level integration frame F24 to be transmitted to the ASIL-D ECU 34 having the highest allocated level, then secondly transmits the level integration frame F23 to be transmitted to the ASIL-C ECU 33 having the second highest allocated level, then thirdly transmits the level integration frame F22 to be transmitted to the ASIL-B ECU 32 having the third highest allocated level, and finally transmits the level integration frame F21 to be transmitted to the ASIL-A ECU 31 having the lowest allocated level. It is noted that a description has been given as to an example in which the signal distribution unit 42 sequentially transmits the level integration frames F21 to F24, starting from the level integration frame F24 to be transmitted to the ASIL-D ECU 34 having the highest allocated level, but the present invention is not limited thereto.

The signal integration unit 41 receives the output frames F31 to F34 respectively transmitted from the ASIL ECUs 31 to 34 in the downstream communication. The signal integration unit 41 integrates, for the respective zone ECUs 21 to 24, pieces of data extracted for the respective zone ECUs 21 to 24, each of which serves as a transmission destination, from pieces of data included in the respective output frames F31 to F34 received at a predetermined constant cycle, thereby generating the transmission destination integration frames F41 to F44 for the respective zone ECUs 21 to 24. It is noted that, in this example, the signal integration unit 41 receives the four output frames F31 to F34 at a predetermined constant cycle, as illustrated in FIG. 13. However, for example, in a case where only three output frames F31 to F33 are received at a predetermined constant cycle, pieces of data extracted for the respective zone ECUs 21 to 23, each of which serves as a transmission destination, from pieces of data included in the three output frames F31 to F33 may be integrated for the respective zone ECUs 21 to 23, thereby generating the transmission destination integration frames F41 to F43 for the respective zone ECUs 21 to 23. Next, the signal distribution unit 42 distributes and transmits each of the transmission destination integration frames F41 to F44 generated by the signal integration unit 41 to a corresponding one of the zone ECUs 21 to 24, each of which serves as a transmission destination. As described above, by using the level integration frame F2 and the transmission destination integration frame F4, the vehicle system 1 can halve the number of frames as compared with a case in which these integration frames are not used, and can suppress an increase in communication volume.

Next, an operation example of the vehicle system 1 will be described. FIG. 14 is a flowchart illustrating an operation example of the vehicle system 1 according to the embodiment. In the vehicle system 1, the zone ECUs 21 to 24 respectively transmit the input frames F1 (F11 to F14) constituting the input signals S1 from the respective devices E to the network branch unit 40 (Step ST1). Next, the signal integration unit 41 of the network branch unit 40 integrates pieces of data extracted for respective levels from pieces of data included in the plurality of input frames F1, thereby generating the level integration frames F2 (Step ST2). For example, the signal integration unit 41 extracts pieces of data for the respective levels of the safety standards (ASIL-A to ASIL-D) from data areas included in the plurality of input frames F1 (F11 to F14) transmitted from the plurality of zone ECUs 21 to 24. Then, the signal integration unit 41 integrates, for the respective levels, the pieces of data extracted for the respective levels of the safety standards, thereby generating the level integration frames F2 (F21 to F24) for the respective levels. Next, the ASIL ECUs 31 to 34 execute confirmation processing related to the safety standard on the pieces of data included in the level integration frames F2 (F21 to F24) (Step ST3). For example, the ASIL-A ECU 31 executes confirmation processing related to ASIL-A on the data included in the data area of the level integration frame F21. Similarly, the ASIL-B ECU 32 executes confirmation processing related to ASIL-B on the data included in the data area of the level integration frame F22, the ASIL-C ECU 33 executes confirmation processing related to ASIL-C on the data included in the data area of the level integration frame F23, and the ASIL-D ECU 34 executes confirmation processing related to ASIL-D on the data included in the data area of the level integration frame F24. Next, the ASIL ECUs 31 to 34 transmit the output frames F3 (F31 to F34) including confirmation processing results to the network branch unit 40 (Step ST4). Next, the signal integration unit 41 integrates pieces of data extracted for the respective transmission destinations from pieces of data included in the plurality of output frames F3, thereby generating the transmission destination integration frames F4 (Step ST5). For example, the signal integration unit 41 integrates, for the respective zone ECUs 21 to 24, each of which serves as a transmission destination, pieces of data extracted for the respective zone ECUs 21 to 24, each of which serves as the transmission destination, from pieces of data included in the output frames F31 to F34 respectively transmitted from the ASIL ECUs 31 to 34, thereby generating the transmission destination integration frames F41 to F44 for the respective zone ECUs 21 to 24, each of which serves as the transmission destination. Next, the zone ECUs 21 to 24 controls the respective devices E based on the data of the transmission destination integration frames F4 (Step ST6). For example, the zone ECU 21 controls the device E of the power train system based on data included in a data area of the transmission destination integration frame F41 transmitted from the network branch unit 40. For example, in a case where data of a confirmation result included in the data area of the transmission destination integration frame F41 transmitted from the network branch unit 40 indicates normal, the zone ECU 21 normally operates the device E of the powertrain system. On the other hand, in a case where the data of the confirmation result included in the data area of the transmission destination integration frame F41 transmitted from the network branch unit 40 indicates an abnormality, the zone ECU 21 executes an error display or a degeneration operation on the device E of the powertrain system.

As described above, the vehicle system 1 according to the embodiment includes the plurality of devices E, the plurality of zone ECUs 21 to 24, the central ECU 30, and the network branch unit 40. The plurality of devices E are mounted on the vehicle V, and a safety standard of a predetermined level is set for a function to be implemented in each of the devices E. The plurality of zone ECUs 21 to 24 control the devices E divided for each control system. The central ECU 30 is capable of executing confirmation processing related to the safety standards for the plurality of devices E. The network branch unit 40 relays, between the plurality of zone ECUs 21 to 24 and the central ECU 30, the input signal S1 related to the confirmation processing from the device E and the output signal S3 related to the confirmation processing from the central ECU 30. Here, the central ECU 30 includes the ASIL ECUs 31 to 34 allocated for the respective levels of the safety standards and configured to be able to execute the confirmation processing corresponding to the allocated level with respect to the device E. The network branch unit 40 distributes and transmits the input signals S1 from the devices E, the input signals S1 being respectively transmitted from the plurality of zone ECUs 21 to 24, to the ASIL ECUs 31 to 34, each of which has a level allocated thereto and configured to correspond to a function of the device E, and distributes and transmits the output signals S3 from the ASIL ECUs 31 to 34 respectively transmitted from the ASIL ECUs 31 to 34 to the zone ECUs 21 to 24 that have respectively transmitted the input signal S1 from the devices E subjected to the confirmation processing.

According to this configuration, in the vehicle system 1, it is not necessary for the ASIL ECUs 31 to 34 to execute processing related to a plurality of levels of safety standards, and in a case where there are a plurality of levels of safety standards in the same system as in the related art, it is not necessary to apply processing of a high level of a safety standard to processing of a low level of a safety standard, and it is possible to prevent excessive performance of the ASIL ECUs 31 to 34. As a result, the vehicle system 1 can reduce the number of man-hours required for system construction, and can suppress development costs. In addition, in the vehicle system 1, since the ASIL ECUs 31 to 34 of the central ECU 30 are allocated one by one for each level of the safety standard, the central ECUs 30 can be aggregated according to the number of levels of the safety standards. As a result, the vehicle system 1 can appropriately construct a system that secures safety.

In the vehicle system 1, the network branch unit 40 integrates, for respective levels, pieces of data extracted for the respective levels from pieces of data included in the plurality of input frames F1 constituting the input signals S1 from the devices E, the input signals S1 being respectively transmitted from the plurality of zone ECUs 21 to 24, thereby generating the level integration frames F2 for the respective levels, and distributes and transmits each of the generated level integration frames F2 to a corresponding one of the ASIL ECUs 31 to 34 each having a corresponding level allocated thereto. In addition, the network branch unit 40 integrates pieces of data extracted for the respective zone ECUs 21 to 24, each of which serves as a transmission destination, from pieces of data included in the plurality of output frames F3 constituting the output signals S3 from the ASIL ECUs 31 to 34, the output signals S3 being respectively transmitted from the ASIL ECUs 31 to 34, for the respective zone ECUs 21 to 24, each of which serves as the transmission destination, thereby generating the transmission destination integration frames F4 for the respective zone ECUs 21 to 24, each of which serves as the transmission destination, and distributes and transmits each of the generated transmission destination integration frames F4 to a corresponding one of the zone ECUs 21 to 24, each of which serves as the transmission destination. According to this configuration, since the vehicle system 1 can reduce the number of frames by integrating the frames, it is possible to suppress an increase in the communication amount in the communication network.

In the vehicle system 1, the network branch unit 40 preferentially transmits the input signals S1 with respect to the ASIL ECUs 33 and 34 having a relatively high allocated level of the safety standard over the input signal S1 with respect to the ASIL ECUs 31 and 32 having a relatively low allocated level of the safety standard. According to this configuration, for example, the vehicle system 1 can preferentially perform the confirmation processing having a relatively high level of a safety standard such as an anti-lock brake function, an electric power steering function, and the like, thereby making it possible to quickly transmit a result of the confirmation processing to the device E that implements a function having a relatively high level of a safety standard. As a result, the vehicle system 1 can quickly operate the device E having relatively high importance such as an anti-lock brake function, an electric power steering function, and the like.

In the vehicle system 1, the processing related to the safety standard having a relatively high level includes at least a part of the processing related to the safety standard having a relatively low level. According to this configuration, the vehicle system 1 can partially share the processing related to the safety standard, and the number of man-hours can be reduced. In addition, even if processing related to a safety standard is partially shared, the vehicle system 1 executes processing related to a safety standard according to a level of individual safety standards and does not execute processing related to a safety standard according to a level of a different safety standard, thereby making it possible to prevent a problem that has occurred in processing having a low safety standard from affecting processing having a high safety standard. As a result, the vehicle system 1 can appropriately construct a system that secures safety.

Modification

Next, a modification of the embodiment will be described. It is noted that, in the modification, component elements equivalent to those in the embodiment are denoted by the same reference numerals, and a detailed description thereof will be omitted.

Figure 2:
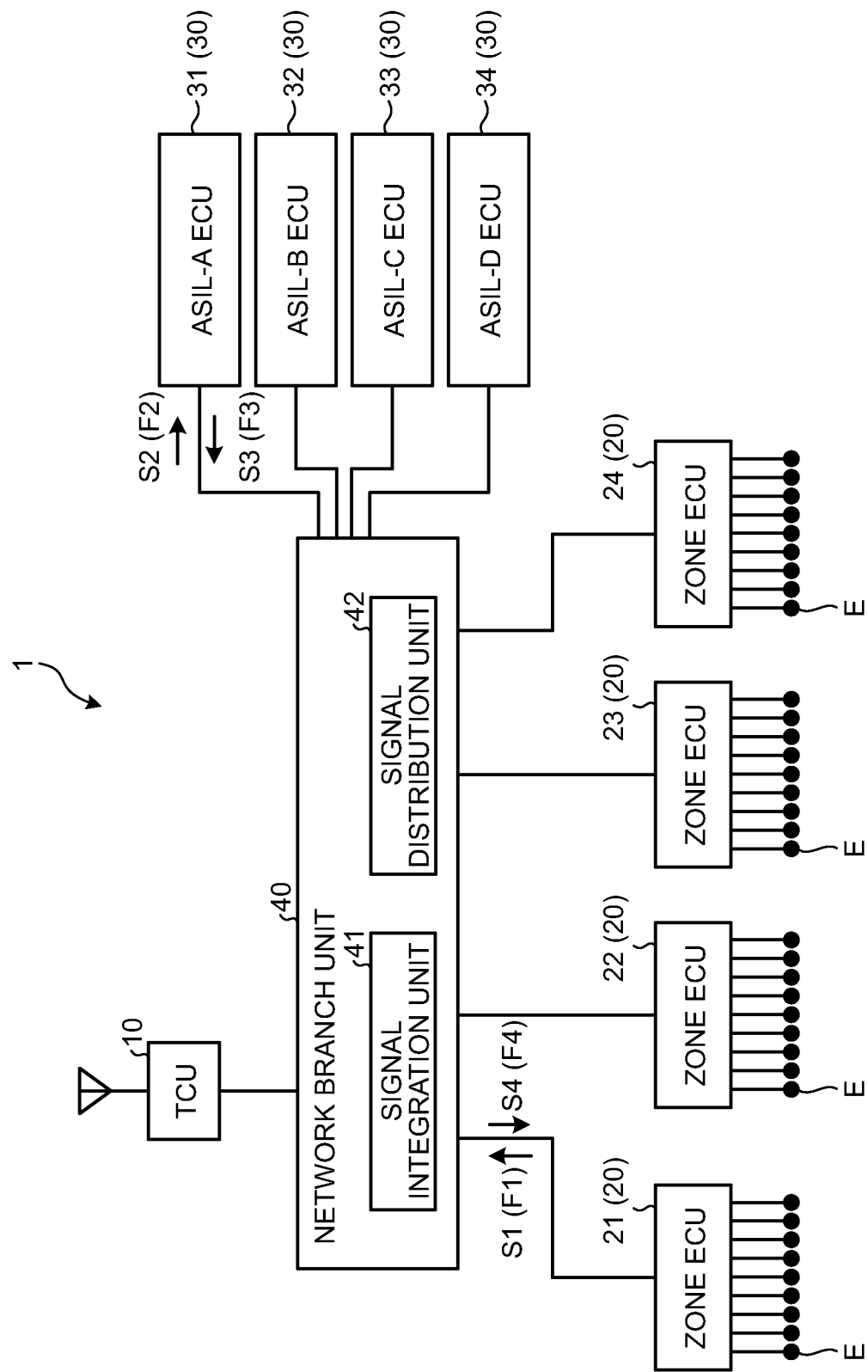
FIG. 2 is a block diagram illustrating the configuration example of the vehicle system according to the embodiment.
Figure 15:
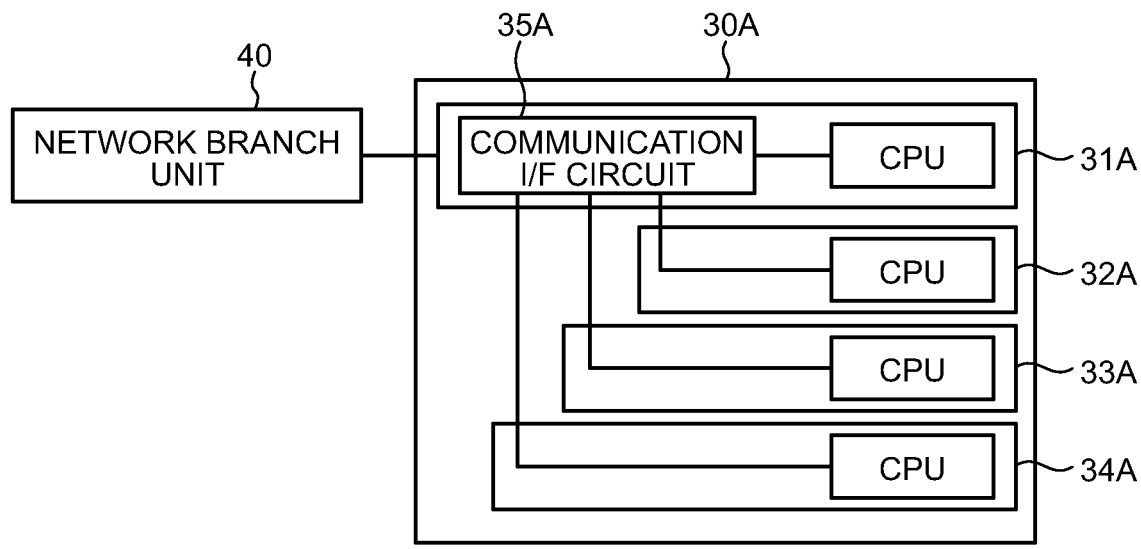
FIG. 15 is a schematic diagram illustrating a configuration example of a vehicle system according to a first modification of the embodiment.
Figure 16:
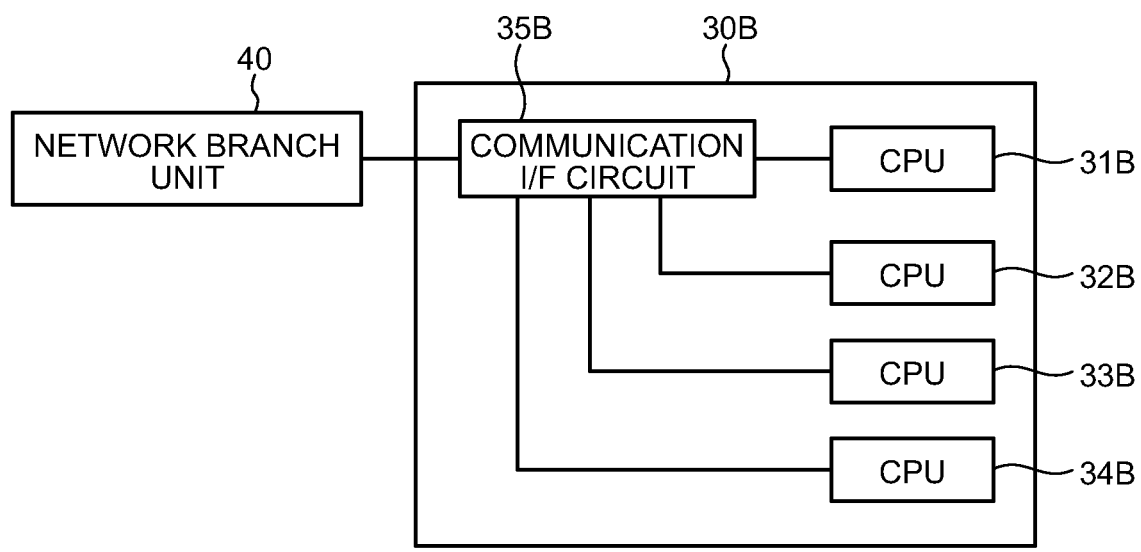
FIG. 16 is a schematic diagram illustrating a configuration example of a vehicle system according to a second modification of the embodiment.

The central ECU 30 may be provided for each of the ECUs (the ASIL-A ECU 31, the ASIL-B ECU 32, the ASIL-C ECU 33, and the ASIL-D ECU 34), as illustrated in FIG. 2, a central ECU 30A may be provided for each of the substrates (an ASIL-A substrate 31A, an ASIL-B substrate 32A, an ASIL-C substrate 33A, and an ASIL-D substrate 34A), as illustrated in FIG. 15, and a central ECU 30B may be provided for each of the CPUs (microcomputers) (an ASIL-A microcomputer 31B, an ASIL-B microcomputer 32B, an ASIL-C microcomputer 33B, and an ASIL-D microcomputer 34B), as illustrated in FIG. 16. It is noted that the central ECU 30A is provided with a communication I/F circuit 35A connected to the network branch unit 40 and the CPU of each substrate, and the central ECU 30B is provided with a communication I/F circuit 35B connected to the network branch unit 40 and each CPU.

A description has been given as to an example in which the network branch unit 40 generates the level integration frames F2 integrated for the respective levels of the safety standards, or generates the transmission destination integration frames F4 integrated for the respective zone ECUs 21 to 24, each of which serves as a transmission destination, integrates the generated frames, and distributes and transmits the frames, but the present invention is not limited thereto. The frames may be individually distributed and transmitted without being integrated.

A description has been given as to an example in which the network branch unit 40 preferentially transmits the input signal S1 with respect to the ASIL ECUs 33 and 34 having a relatively high allocated level of the safety standard over the input signal S1 with respect to the ASIL ECUs 31 and 32 having a relatively low allocated level of the safety standard, but the input signal S1 may be transmitted without preferentially transmitting the input signals based on such a level of the safety standard.

A description has been given as to an example in which the processing related to the safety standard having a relatively high level includes at least a part of the processing related to the safety standard having a relatively low level, but the present invention is not limited thereto, and the processing related to the safety standard may be configured by another method.

Although a description has been given as to an example in which the plurality of areas D are divided into four areas, the present invention is not limited thereto, and the plurality of areas D may be divided into other numbers of areas.

The plurality of device controllers 20 are typically divided for each area/zone, but the division for each area/zone is merely an example. For example, the device controllers 20 may be provided for each domain representing a system for controlling the vehicle V. When the plurality of device controllers 20 are provided for each domain, the plurality of devices E connected to respective device controllers 20 are devices E in the same domain (control system).

Although ASIL defined in the ISO 26262 standards has been described as a safety standard, the safety standard is not limited thereto and may be other standards.

A description has been given as to an example in which the devices E that implement functions in which different ASILs are set are respectively connected to the I/O 211c to the I/O 214c, but the present invention is not limited thereto. For example, different ASILs may be mixed in the devices E in the I/O 211c to the I/O 214c. For example, the devices E of ASIL-A to ASIL-D may be mixed and connected to the I/O 211c.

A vehicle system according to the present embodiment does not need to execute processing related to a safety standard at a plurality of levels. Accordingly, in a case where there are safety standards at a plurality of levels in the same system as in the related art, it is not necessary to apply processing of a safety standard at a high level to processing of a safety standard at a low level, and as such excessive performance is not given. Therefore, a system for securing safety can be appropriately constructed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle system comprising:
a plurality of devices mounted on a vehicle, each of the devices implementing a function having a safety standard of a predetermined level set therein;
a plurality of device controllers configured to respectively control the devices divided for each control system;
a central controller configured to be able to execute, on the plurality of devices, confirmation processing related to the safety standard; and
a relay unit configured to relay, between the plurality of device controllers and the central controller, an input signal related to the confirmation processing from the device and an output signal related to the confirmation processing from the central controller,
wherein the central controller is configured to include a plurality of single-level controllers, wherein each of the single-level controllers is allocated to a corresponding one of the levels of the safety standards and is capable of executing, on the device, the confirmation processing corresponding to the allocated level, and
wherein the relay unit is configured to distribute and transmit each of the input signals from the devices, the input signals being respectively transmitted from the plurality of device controllers, to a corresponding one of the single-level controllers, each of the single-level controllers having the level allocated thereto and configured to correspond to the function of the device, and to distribute and transmit each of the output signals from the single-level controllers, the output signals being respectively transmitted from the plurality of single-level controllers, to a corresponding one of the device controllers, each of the device controllers having transmitted the input signal from the device subjected to the confirmation processing.

2. The vehicle system according to claim 1, wherein the relay unit is configured to:

integrate, for respective levels, pieces of data extracted for the respective levels to generate level integration frames for the respective levels, wherein the pieces of data are extracted from pieces of data included in a plurality of frames forming the input signals from the devices, wherein the input signals are respectively transmitted from the plurality of device controllers, and distribute and transmit each of the generated level integration frames to a corresponding one of the single-level controllers, each of the single-level controllers having the level allocated thereto; and integrate, for the respective device controllers, each of the device controllers serving as a transmission destination, pieces of data extracted for the respective device controllers, each of the device controllers serving as the transmission destination, to generate transmission destination integration frames for the respective device controllers, each of the device controllers serving as the transmission destination, wherein the pieces of data are extracted from pieces of data included in a plurality of frames forming the output signals from the single-level controllers, wherein the output signals are respectively transmitted from the plurality of single-level controllers, and distribute and transmit each of the generated transmission destination integration frames to a corresponding one of the device controllers, each of the device controllers serving as the transmission destination.

3. The vehicle system according to claim 2, wherein the relay unit is configured to preferentially transmit the input signal with respect to the single-level controller having the relatively high allocated level over the input signal with respect to the single-level controller having the relatively low allocated level.

4. The vehicle system according to claim 2, wherein processing related to the safety standard having the relatively high level includes at least a part of processing related to the safety standard having the relatively low level.

5. The vehicle system according to claim 1, wherein the relay unit is configured to preferentially transmit the input signal with respect to the single-level controller having the relatively high allocated level over the input signal with respect to the single-level controller having the relatively low allocated level.

6. The vehicle system according to claim 5, wherein processing related to the safety standard having the relatively high level includes at least a part of processing related to the safety standard having the relatively low level.

7. The vehicle system according to claim 1, wherein processing related to the safety standard having the relatively high level includes at least a part of processing related to the safety standard having the relatively low level.

* * * * *